United States Patent
Vogt et al.

(10) Patent No.: US 8,620,575 B2
(45) Date of Patent: Dec. 31, 2013

(54) ROUTE GUIDANCE METHOD AND SYSTEM FOR IMPLEMENTING SUCH A METHOD, AS WELL AS A CORRESPONDING COMPUTER PROGRAM AND A CORRESPONDING COMPUTER-READABLE STORAGE MEDIUM

(75) Inventors: Wilhelm Vogt, Lichtenau (DE); Axel Varchmin, Giesen (DE); Kerstin Mai, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 729 days.

(21) Appl. No.: 12/305,445

(22) PCT Filed: Oct. 12, 2007

(86) PCT No.: PCT/EP2007/060861
§ 371 (c)(1),
(2), (4) Date: Sep. 28, 2009

(87) PCT Pub. No.: WO2008/068090
PCT Pub. Date: Jun. 12, 2008

(65) Prior Publication Data
US 2010/0042314 A1 Feb. 18, 2010

(30) Foreign Application Priority Data
Dec. 6, 2006 (DE) .......................... 10 2006 057 428

(51) Int. Cl.
*G01C 21/00* (2006.01)
(52) U.S. Cl.
USPC ........................................................ 701/410
(58) Field of Classification Search
USPC ......... 701/400, 408–410, 412, 414–415, 419, 701/423, 429, 431
See application file for complete search history.

(56) References Cited

U.S. PATENT DOCUMENTS

| 5,612,882 | A * | 3/1997 | LeFebvre et al. | 701/423 |
| 2003/0225508 | A9 * | 12/2003 | Petzold et al. | 701/201 |
| 2005/0096842 | A1 | 5/2005 | Tashiro | |
| 2006/0178807 | A1 | 8/2006 | Kato et al. | |

FOREIGN PATENT DOCUMENTS

| EP | 0 703 436 | 3/1996 |
| EP | 0 978 706 | 2/2000 |
| GB | 2 323 168 | 9/1998 |
| JP | 2000-344033 | 12/2000 |
| JP | 2005-98749 | 4/2005 |

(Continued)

OTHER PUBLICATIONS

International Search Report of Application No. PCT/EP2007/060861, dated Jan. 2, 2008.

*Primary Examiner* — Kim T Nguyen
(74) *Attorney, Agent, or Firm* — Kenyon & Kenyon LLP

(57) ABSTRACT

The invention relates to a route guidance method and a system for implementing such a method, and a corresponding computer-readable storage medium, which in particular may be used for an adaptive route guidance, the travel routes being selected that offer the highest safety when following the required driving maneuvers. For this purpose, it is recommended to output driving recommendations as a function of the risk of calculated routes. To this end, information about the current traffic situation in the surroundings of the vehicle is evaluated, the risk of the driving maneuvers resulting from calculated routes is evaluated using the results of the evaluation by at least one computer program, and driving instructions are output as a function of the evaluation.

20 Claims, 4 Drawing Sheets

(56) References Cited

FOREIGN PATENT DOCUMENTS

| | | |
|---|---|---|
| JP | 2005-315715 | 11/2005 |
| JP | 2006-153468 | 6/2006 |
| JP | 2006-313085 | 11/2006 |
| WO | 96/24108 | 8/1996 |

* cited by examiner

| Risk group | Risk subgroup | Examples | Affected Road Users |
|---|---|---|---|
| Static | Permanent | Areas, e.g., the Bronx | All |
| | | Routes, e.g., confusing, tunnel | Vehicles |
| | | Routes, e.g., steep, deserted, slippery, underpasses | Pedestrians, cyclists |
| | | Many turning maneuvers/lane changes | Vehicles |
| | | Many crossings without traffic lights, wide roads, no crosswalks | Pedestrians, cyclists |
| | | Grade crossings | All |
| | | Bike paths present | Cyclists |
| | Resulting from a time-variation curve | Areas, e.g., city centers during rush hour | Vehicles |
| | | Routes, e.g., arterial roads after closing time | Vehicles |
| | | Roads, parks, or places at night | Pedestrians |
| | Seasonally driven | Passes in winter | All |

Fig. 4A

| | | | |
|---|---|---|---|
| | Seasonally driven and resulting from a time-variation curve | Deer crossings during mating season at twilight | Vehicles |
| | Semi-permanent | Construction sites having corresponding lane constrictions | All |
| Weak-dynamic | Weather | E.g., during a thaw, routes having many curves, poor paving, high position above sea level | All |
| | Specific driving behavior | E.g., danger when turning left, changing lanes in the city, in snow | Vehicles |
| | Short-term construction sites | E.g., in the event of lane constrictions | All |
| | Demonstrations, rallies, sporting events | In the event of hooligans | All |
| High-dynamic (driving situation) | Traffic density from surroundings-information (Car2Car, Car2Infrastructure, video, radar, etc.), current speed, possible alternative routes | Lane changes and turning maneuvers possibly particularly dangerous | Vehicles |

Fig. 4B

ROUTE GUIDANCE METHOD AND SYSTEM FOR IMPLEMENTING SUCH A METHOD, AS WELL AS A CORRESPONDING COMPUTER PROGRAM AND A CORRESPONDING COMPUTER-READABLE STORAGE MEDIUM

FIELD OF INVENTION

The present invention relates to a route guidance method and a system for implementing such a method as well as a corresponding computer program and a corresponding computer-readable storage medium, which in particular may be used for an adaptive route guidance when using a vehicle navigation system, in order to increase the driving safety and driving comfort.

BACKGROUND INFORMATION

Algorithms for estimating traffic density and for traffic-jam warning or for detecting disruptions in road traffic are already known. These algorithms process static and/or dynamic traffic data, which are obtained via measuring loops embedded in the roadway or by measurements in individual vehicles. In individual vehicles, distance data for preceding or subsequent vehicles are ascertained with the aid of measurement devices of an intelligent cruise control or of a so-called ACC system (ACC=adaptive cruise control), or the velocity of the vehicle is recorded, etc. Such algorithms for evaluating the traffic situation are normally used in traffic control centers, but may also be used directly in the on-board computer of a vehicle for processing these data. In this connection, the vehicle-vehicle communication, which is presently being developed, allows for the exchange of data that are necessary for such calculations.

In addition to such central systems for detecting the traffic situation, vehicle navigation systems are described, for example, in U.S. Pat. No. 5,291,412, that can determine the current position of the vehicle with high accuracy, as a rule using satellite support. Current vehicle navigation systems calculate the shortest, quickest or "optimal" (as a rule, a mixture of these two criteria) route from the current vehicle position to the desired destination. In this context, current traffic messages are taken into account so that systems having a corresponding TMC connection may avoid traffic jams when the alternate route is more favorable.

Moreover, design approaches are known that are called so-called lane assistants, which monitor the lane behavior of a vehicle with the aid of sensors and inform the driver if the vehicle leaves a lane on which it has been traveling. In this way, the vehicle is prevented from unintentionally deviating from the lane.

However, to date the known systems are used only for route guidance or traffic control, but not to evaluate the safety of planned driving maneuvers. The topic of safety is playing an increasingly important role in vehicle concepts. The point is no longer only to be guided as quickly as possible to the destination, but rather also to be guided as safely as possible. At the moment, this is ensured by providing driving instructions early. However, in the event of unfavorable traffic conditions, the driver may not be able to follow the instructions, for example, to exit an expressway, in time, perhaps because he is located in the outermost passing lane and the other lanes, which he would have to cross, are relatively crowded. Following the driving instruction would possibly mean putting the driver and the other road users in danger. To date, it is not possible for the vehicle navigation system to detect such a dangerous situation. Thus, it would be desirable to expand the known systems in this regard.

SUMMARY OF THE INVENTION

It is thus an objective of the present invention to provide a route guidance method and a system for implementing such a method, as well as a corresponding computer program and a corresponding computer-readable storage medium, which avoid the above-mentioned disadvantages, and in particular increase driving safety.

The method according to the present invention offers the advantage that a user of the route guidance method according to the present invention, such as a vehicle driver, cyclist, inline skater, or pedestrian, is provided with driving recommendations that ensure high safety when traveling the route, in comparison with alternative route guidance systems. This is achieved in that at least one route is calculated on the basis of information about travel destination and start location, and driving recommendations are output as a function of the risk of calculated routes. In one preferred embodiment of the route guidance method according to the present invention, routes are evaluated with regard to a static and/or dynamic risk. Preferably, static risks are already taken into account in an initial route calculation; dynamic risks, on the other hand, are preferably included in a route calculation at short notice.

In another preferred embodiment of the route guidance method according to the present invention, it is provided that risks are taken into account in the evaluation of a route as a function of a user of the route guidance method. Thus, for example, when pedestrians use the route guidance method, steep, deserted, slippery paths, or roads, parks, or places at night may be evaluated as having a higher risk; when cyclists use the route guidance method, paths having bike paths may be evaluated in particular; when vehicle drivers use the route guidance method, specific regions, for example, city centers during rush hour, or specific routes, such as arterial roads after closing time, may be particularly taken into account.

Another preferred embodiment of the route guidance method according to the present invention provides that information about the current traffic situation in the surroundings of the user of the route guidance system, in particular in the surroundings of the vehicle, is evaluated if the user of the route guidance method is a vehicle driver. The risk of the motion behavior or of the resulting driving maneuvers is evaluated using the results of the evaluation by at least one computer program, and driving recommendations are output as a function of the evaluation. Here, motion behavior refers to, among other things, driving maneuvers such as turning, changing lanes, or the like, for example, or also direction changes of pedestrians, all such behaviors that are required in order to follow the suggested route. Advantageously, the route is evaluated when on the route being traveled there is a plurality of alternatives for the further route, for example, at intersections or expressway exits. The start position is then the respective current position of the vehicle or pedestrian.

Advantageously, the risk evaluation is carried out:
for turning maneuvers required in order to follow the respective (driving) route, and/or
for lane changes required in order to follow the respective (driving) route; and/or
the risk evaluation takes into account:
the traffic density in the surroundings of a road user such as a motor vehicle, for example,
the speed of a motor vehicle. and/or
alternative (driving) routes.

In one preferred embodiment of the method according to the present invention, it is provided that the computer program has at least one interface to a navigation system, such as a vehicle navigation system or a navigation system installed on a mobile telephone or personal digital assistant (PDA), for example, or that the computer program is integrated in such a navigation system, and driving recommendations are output by the navigation system as a function of the risk evaluation.

In another preferred embodiment of the method according to the present invention, it is provided that the calculation of travel routes includes an evaluation of the travel routes with regard to travel time and travel-route length, which evaluation is assessed with regard to the driving maneuvers resulting from the travel routes with regard to the risk and the travel time, and/or travel-route length difference, in comparison with alternative travel routes. It is thus possible to avoid a situation in which the length of the alternative route, or the extension of the travel time, is disproportionate to the safety gain through the safer, alternative travel route. Analogously, routes of pedestrians are evaluated with regard to the time required to travel the route, and the route length. The pedestrian's motion behavior resulting from the route is likewise evaluated with regard to the risk and the time and/or route-length difference relative to alternative routes.

Driving safety is also increased by determining the timing for the output of driving instructions as a function of the evaluation of risks of a driving maneuver. Thus, when the risk of a driving maneuver is high, driving instructions for a travel route that is optimal in terms of time and/or distance should be output earlier than they are when the risk is low. In this case, the driving instruction for the optimal driving route is output. However, it may also be provided that in the event of a high-risk driving maneuver for an optimal travel route, driving instructions for a suboptimal route, with regard to travel time and travel route length, are output. For pedestrians, these output times are rather less significant, since as a rule a pedestrian has time to make decisions about routes to be taken. He is able to concern himself with the route guidance more intensively, so that another exemplary embodiment provides outputting a larger amount of information regarding which risks exist on which route, so that the user himself may decide which way is more attractive to him.

In an additional preferred embodiment of the method according to the present invention, it is provided that navigation instructions or driving recommendations are output for a plurality of alternative (driving) routes. In this context, it is advantageous if the sequence in which the navigation or travel instructions are output is determined by the evaluation of the respective (driving) route. Furthermore, in another preferred embodiment of the method according to the present invention, it is provided that information about the anticipated time required to travel the respective route and/or about the length of (driving) routes is additionally output. In this case, all fundamental information that is important for an evaluation of the travel instructions is given to the user, that is, the vehicle driver, cyclist, inline skater, or pedestrian.

When a Car2Car communication system exists, another preferred embodiment of the method according to the present invention provides that travel routes are determined through automatic coordination with neighboring vehicles, which likewise possess a Car2Car communication system, in that the risk is evaluated as lower since a cooperative driving behavior is possible.

Navigation or driving instructions may be output acoustically and/or visually. It is particularly advantageous for drivers of a vehicle (motor vehicles, motorcycle, bicycle, or the like) when the navigation or driving instructions are output in different colors and/or different levels of brightness in the visual output, as a function of the evaluation, since in this manner the vehicle driver is able to get an overview of the driving situation at a glance.

An additional preferred embodiment of the method according to the present invention provides that information about the current traffic situation is obtained via:
radar sensors,
video sensors,
Car2Car communication systems,
vehicle-surroundings communication systems, (Car2Infrastructure communication systems)
a TMC system (TMC=Traffic Message Channel),
a traffic control center, and/or
a traffic control device.

In the following, instead of the term "communication system," the term "sensor" is used for the sake of simplicity, since this system receives data that may be considered by the receiver as being analogous to sensor data. In this context, the connection of the vehicle navigation system to external sensors, such as radar, video, Car2Car, and/or Car2Infrastructure sensors, may be implemented via a bus system or an air interface.

One system according to the present invention includes at least one chip and/or processor that is/are set up such that a route guidance method is able to be executed, driving recommendations being output as a function of the risk of calculated routes.

Another system according to the present invention includes at least one chip and/or processor that is/are set up such that a method for guiding a motor vehicle is able to be executed, information about the current traffic situation in the vehicle's surroundings being evaluated, the risk of the driving maneuvers resulting from calculated routes being evaluated by at least one computer program using the results of the evaluation, and travel instructions being output as a function of the evaluation.

One preferred embodiment of the system according to the present invention provides that the system includes a navigation system, in particular, a vehicle navigation system.

In another preferred embodiment of the system according to present invention, the system includes at least one:
radar sensor,
video sensor,
biometric sensor (for detecting driver behavior),
vehicle environment (temperature, lightness, wetness, etc.) sensor,
Car2Car sensor, and/or
vehicle-surroundings sensor (Car2Infrastructure sensor).
Vehicles that are equipped with such sensors may monitor and assess the current traffic situation. In these instances, it is possible to provide this information to the vehicle navigation system via an interface. This information may then be used by the vehicle navigation system to the effect that an alternative or new driving instruction is given to the driver, which indeed under certain circumstances would mean a small detour, but less stress and risk.

Once it has been loaded in the memory of the data processing device, a computer program according to the present invention makes it possible for a data processing device to execute a route guidance method, driving recommendations being output as a function of the risk of calculated routes.

Once it has been loaded in the memory of the data processing device, another computer program according to the present invention makes it possible for a data processing device to execute a method for guiding a motor vehicle, information about the current traffic situation in the vehicle's surroundings being evaluated, the risk of the driving maneuvers resulting from calculated routes being evaluated by at least one computer program using the results of the evaluation, and travel instructions being output as a function of the evaluation.

Such computer programs may be provided in a data network or communication network in a downloadable manner (for a fee or free, freely accessible or password-protected). The computer programs provided in this manner may then be rendered usable by a method, in which a computer program is downloaded from an electronic data network, such as the Internet, to a data-processing device connected to the data network.

In order to guide a motor vehicle in accordance with the present invention, it is provided that a computer-readable storage medium be used in which a program is stored that, once it has been loaded into the memory of the data-processing device, allows a data-processing device to execute a route guidance method, driving recommendations being output as a function of the risk of calculated routes.

Another computer-readable storage medium according to the present invention is characterized in that a program is stored in it that, once it has been loaded into the memory of the data processing device, allows a data processing device to execute a method for guiding a motor vehicle, information about the current traffic situation in the vehicle's surroundings being evaluated, the risk of the driving maneuvers resulting from calculated routes being evaluated by at least one computer program using the results of the evaluation, and travel instructions being output as a function of the evaluation.

A particular advantage of the present invention is the safety-dependent driving instruction. This instruction may possibly be suboptimal with regard to the distance and the travel time to the destination; however, in return, the risk of an accident is reduced. As external sensor information is fed in, the risk is evaluated and weighted relative to the possible detour in order to avoid unreasonably long detours or long travel times that are disproportionate to the safety gain.

BRIEF DESCRIPTION OF THE DRAWINGS

FIGS. 4A to 4B show an illustration in table form of a possible grouping of events fraught with risk for the route evaluation.

DETAILED DESCRIPTION

Figure 1:
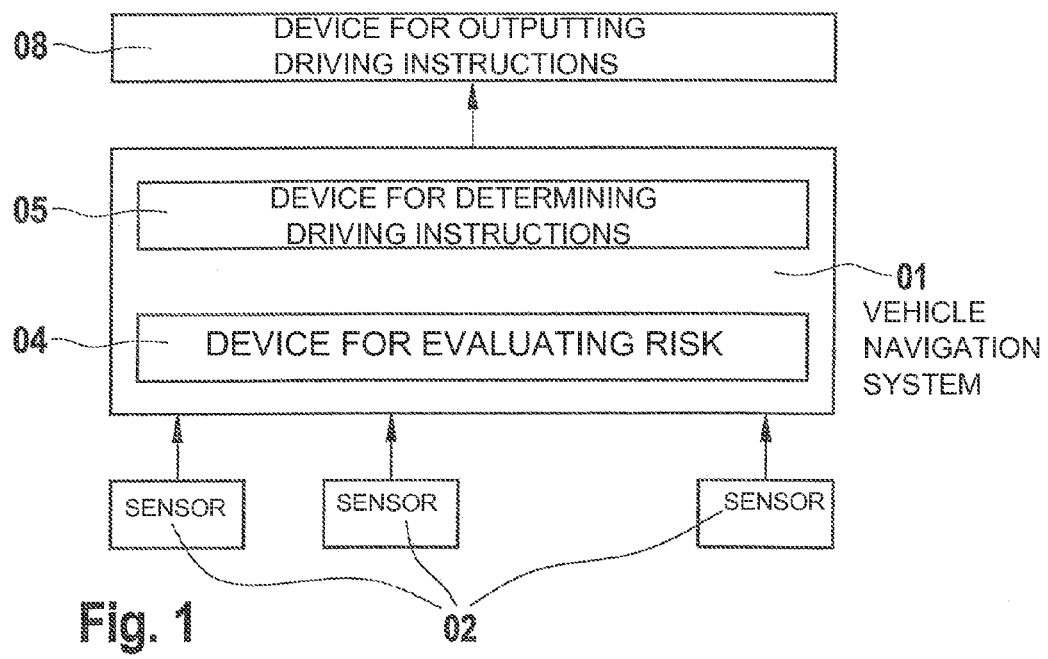
FIG. 1 shows a schematic illustration of the interplay between individual components of an exemplary system according to the present invention.

In the following, the present invention will be described using different exemplary embodiments.

Since in the present invention route recommendations are given as a function of risks, some more detailed considerations regarding different risk types are to be made first (see also FIGS. 4A to 4B).

In one exemplary embodiment of the present invention, risks are divided into static and dynamic risks, it being possible to further subdivide dynamic risks into weak-dynamic and high-dynamic.

Static Risks:

Static risks may occur permanently, may occur as a result of a time-variation curve, and/or may occur as a result of season.

A permanent risk may be assumed for specific urban areas (for example, the Bronx, N.Y.) or for specific routes. A static permanent risk of a route may be assumed, for example, if the route is confusing, passes through a tunnel or an underpass, is steep, deserted, or slippery.

For this purpose, in one additional exemplary embodiment it is provided that a user may evaluate or weight the individual risks in his system control, ideally in advance. This may lead to an older person completely avoiding steep routes, for example, while a younger person sets the risk to only 10%. Analogously, evaluations for underpasses may have differing strengths for women and men. At the same time, while individual conditions present a risk for all users equally (possibly having different weights), for example, an urban area such as the Bronx, N.Y. would present a certain risk for pedestrians, cyclists, inline skaters, and also motorcycle and car drivers at all times; likewise, specific conditions of the route, such as grade crossings, also present a risk for all users at all times and should thus be categorized as a permanent risk. Other permanent risks are relevant only for individual users, such as motorists or pedestrians/cyclists. For example, routes having numerous turning maneuvers or lane changes for vehicles 03 could be evaluated as having an increased risk. In contrast, routes having existing bike paths would be preferable for cyclists, that is, should be evaluated as having a lower risk than routes without bike paths. For cyclists and pedestrians, for example, the evaluation of route conditions such as confusing, steep, deserted, or slippery routes would be valuable, whether the route has underpasses, or whether many crossings without traffic lights are necessary or wide roads without crosswalks have to be crossed in a route.

Specific regions or specific routes, for example, city centers or arterial roads, during rush hour, or roads, parks, and places at night, should be evaluated as having a varyingly high risk resulting from a time-variation curve. Here too, as a rule the estimation of the risk for vehicles 03 would have to be evaluated differently than that for pedestrians or cyclists. For vehicles 03, areas or routes should be evaluated as having a higher risk during rush hour, while the criterion "street, park, or place at night" is significant for pedestrians and cyclists.

For example, passes in winter are static, seasonally driven risks for all road users.

Additionally, static seasonally driven and time-variation-curve-driven risks may be taken into account in the route calculation; this includes, for example, deer crossings during mating season at twilight, which are taken into account in particular for the route calculation for vehicles 03 in one exemplary embodiment of the present invention.

In another exemplary embodiment of the present invention, static quasi-permanent risks are taken into account in the route calculation or route evaluation as a further subgroup of the static risks. This includes, for example, construction sites with corresponding lane constrictions, which are to be categorized as a risk for all road users.

In one further exemplary embodiment of the present invention, a "weak-dynamic" risk group is provided. The weather would be one such weak-dynamic risk, which is included, and possibly weighted differently, in the route calculation for all road users so that during a thaw paths having many curves, poor paving, a high altitude above sea level, gravel roads, or the like are evaluated as having a correspondingly higher risk in the corresponding weather conditions.

Other weak-dynamic risks are, for example, specific driving behavior, short-term construction sites, or demonstrations, rallies, or sporting events, which are accordingly weighted, for example, with regard to a danger when turning left, when changing lanes, when driving in the city or in snow (specific driving behavior), in the event of lane constrictions (short-term construction site), or in the presence of hooligans (demonstrations, rallies, or sporting events).

A further important risk group for the evaluation of the routes is high-dynamic risks, which result in particular from the current driving situation of vehicles 03. In this context, information regarding the surroundings of vehicle 03, the velocity of vehicle 03, and/or possible alternative routes are taken into account. In this context, the information regarding the surroundings of vehicle 03 is ascertained by sensor systems such as radar sensors, video sensors, Car2Car sensors, Car2Infrastructure sensors, or the like. These parameters are then taken into account in the evaluation of driving maneuvers for the provided travel route, such as necessary lane change or turning maneuvers.

In one exemplary embodiment of the present invention, static and possibly weak-dynamic influences are taken into account already in the preliminary stages in the route calculation; high-dynamic influences are included in the calculation at short notice. Driving recommendations may be output in various ways as a function of the risk type: for example, in the event of static risks, instructions for the optimal route could be given early in order to avoid distracting the driver with instructions in high-risk situations; in the event of high-dynamic influences, suboptimal instructions could be given in high-risk situations in order to avoid risky driving maneuvers. In low-risk situations, it could be provided that a plurality of alternative instructions are given, the sequence of the alternative instructions and/or supplementary information for the alternative instructions indicating to the user of the navigation system the advantages and disadvantages associated with the respective routes.

Because the pedestrian has time to concern himself with the route guidance, another exemplary embodiment provides outputting additional information about which risks lie on which routes, so that the user himself may decide which way is the most favorable for him.

Figure 2:
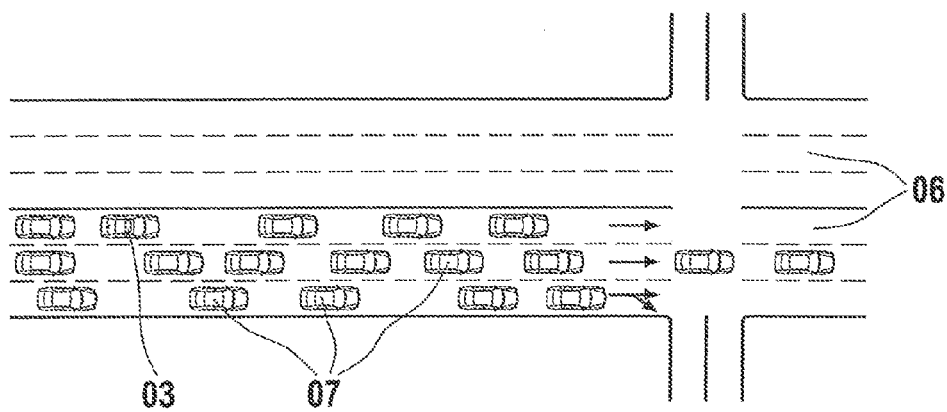
FIG. 2 shows an illustration of a traffic situation that leads to a suboptimal driving instruction.

In one possible embodiment, the present invention may be executed as an upgrade to a traditional vehicle navigation system 01. In such an exemplary embodiment, vehicle navigation system 01 has a connection to external sensors 02, such as radar sensors, video sensors, Car2Car sensors, and/or Car2Infrastructure sensors, for example, via a bus system or an air interface. These sensors 02 provide information about the current traffic situation in the surroundings of vehicle 03. With the help of this information, vehicle navigation system 01 may evaluate the risk of performing a driving maneuver that is optimal in terms of time and distance, that is, a maneuver that follows the shortest, quickest, or optimal route. To this end, in one exemplary embodiment, navigation system 01 includes means 04 for evaluating the risk in following the optimal driving instruction and means 05 for determining driving instructions that are optimal in terms of safety, taking into account a possible detour. In one exemplary embodiment, means 05 for determining driving instructions that are optimal in terms of safety weights the risk relative to a possible detour or time loss. If this risk is small, for example, straight-ahead driving or turning on a one-lane road, the optimal driving instruction is output. However, if the risk is relatively high, for example, when turning on a street having multiple driving lanes 06, whereby lane-changes would be necessary in dense traffic, under certain circumstances the suboptimal driving instruction is output. FIG. 2 shows such a situation. Currently, vehicle 03 is located in the outermost left lane. According to the optimal travel route, the driver would actually have to turn right and to this end would have to change lanes twice in dense traffic, however. For this reason, here a "straight" would be recommended, as long as the resulting detour is not too long.

In such a situation, the following alternatives may be provided:

The optimal driving instruction is given earlier than usual so that the driver has more time to situate himself correctly and to execute the driving maneuver safely and in a stress-free manner. One possible development stage of this system provides informing the driver explicitly that following this optimal driving instruction is important since otherwise a detour of x km would automatically result along with the corresponding time loss, for example, because no other expressway exit exists within the next 20 km.

A suboptimal driving instruction is given, for example, a recommendation is made to the driver to continue driving straight, but to keep right, even though he actually should have exited the expressway. The detour resulting thereby should, however, have a reasonable relationship to the risk that following the optimal driving instruction would have meant. In this case, the driver possibly does not even notice that he actually should have left the expressway and arrives at the destination in a manner that is more stress-free, since he does not attempt to follow the driving instruction at all costs. At the next exit, he is then prompted to exit.

A plurality of alternative driving instructions is given, for example, a recommendation is given to the driver to drive straight or to turn right. In this context, the sequence of the instructions could make it possible to distinguish between optimal and suboptimal instruction. In an additional development stage, distances and/or times for the alternatives could possibly be output as well.

A further variant provides—in particular when a Car2Car sensor is present—that host vehicle 03 coordinates its intention to turn with other road users 07, in order to be able to then cooperatively and uncritically travel the optimal path.

In an alternative embodiment, it is provided that a route is calculated for all possible exit paths of an intersection and the driver is provided with time and distance information for these alternatives.

Figure 3:
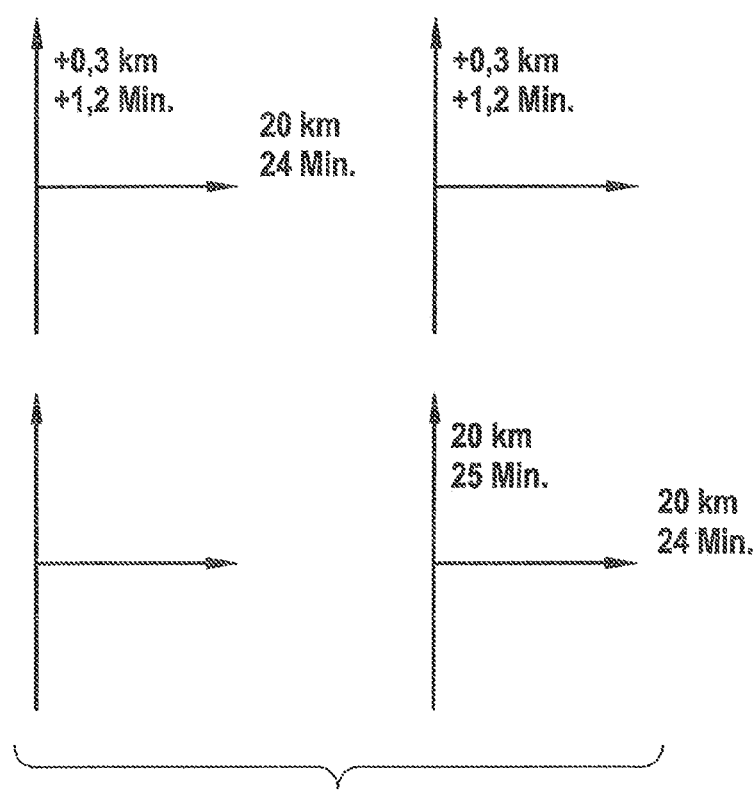
FIG. 3 shows exemplary illustrations for the optical display of the driving instructions.

In order to clearly inform the driver about the alternative travel routes, vehicle navigation system 01 is equipped with means 08 for outputting driving instructions that are optimal in terms of safety, for example, a human-machine interface (HMI). Advantageously, means 08 for outputting driving instructions that are optimal in terms of safety are provided with possibilities for the acoustic and also visual output of the driving instructions. For the optical output, a color identification of the different paths may be provided (see FIG. 3) (dark paths are to be preferred, for example, light ones are worse, depending on the gray-scale value, the driver then sees at a glance which possibilities are really worth discussing). Alternatively, one could also work with colors, thickness of dashes, solid or dotted display, etc. Acoustically, one could analogously work with volume or sequence of the instruction.

However, the previously described turn-by-turn displays may be transferred analogously to 2D or 3D displays, that is, it is possible to use a display in any scale of the 2 or 3 dimensional map. In certain situations, this has the advantage that the driver obtains a larger overview of the varied highway routing. (For example, 3D displays of the pictograms with the route, or in the video image/photo.)

In addition to corresponding sensor system 02, knowing, for example, the number of lanes 06 and the turning possibilities on individual lanes 06 is important in all of these scenarios, which means that when the method according to the present invention is executed, relevant map material is accessed.

The points listed above for vehicle navigation systems 01 are also essentially valid for navigation systems that are used by pedestrians, cyclists, inline skaters, other recreational athletes or other users who move at a lower speed. Such navigation systems are then as a rule installed on mobile terminals, such as personal digital assistants (PDA), for example, electronic travel guides, or mobile phones. On the other hand, in the different embodiments, it is advantageous to take into account some special risk types that occur in this group and that are described in more detail above (see also FIGS. 4A to 4B).

The present invention is not limited in its embodiment to the preferred exemplary embodiment stated above. Rather, a number of variants could conceivably make use of the system and the method according to the present invention even for basically different types of embodiments.

What is claimed is:

1. A route guidance method, comprising:
    calculating at least one route by a navigation system based on information about destination and start location, wherein the at least one route is evaluated as a function of a dynamic risk, and wherein the dynamic risk is included in a route calculation at a short notice so that information about the current traffic situation in the surrounding of a user of the route guidance method is evaluated;
    evaluating a risk of motion behavior resulting from the calculated at least one route using results of the evaluation by at least one computer program;
    outputting driving recommendations as a function of the evaluation; and
    outputting a plurality of alternative routes as a function of the risk of the motion behavior of the at least one calculated route.

2. The route guidance method according to claim 1, further comprising:
    evaluating the at least one route as function of a static risk and the dynamic risk.

3. The route guidance method according to claim 2, wherein the static risk is taken into account already in an initial route calculation.

4. The route guidance method according to claim 2, wherein when evaluating the at least one route, risks are taken into account as a function of the route guidance.

5. The route guidance method according to claim 1, wherein the computer program includes at least one interface to the navigation system or is integrated in the navigation system, and wherein the driving recommendations are output by the navigation system as a function of the risk evaluation.

6. The route guidance method according to claim 1, wherein the calculating of the at least one route includes evaluating the routes as a function of time required to travel the route and route length, and evaluating the motion behavior resulting from the routes as a function of the risk and at least one of the time and route-length difference relative to the alternative routes.

7. The route guidance method according to claim 1, further comprising:
    determining a timing of the outputting of driving recommendations as a function of the evaluation of risks of the motion behavior.

8. The route guidance method according to claim 7, further comprising:
    when the risk of the motion behavior is high, outputting driving the recommendations for a travel route that is optimal in terms of at least one of time and distance earlier than when the risk of the motion behavior is low.

9. The route guidance method according to claim 7, further comprising:
    when the risk of the motion behavior for an optimal route is high, outputting driving recommendations for a route that is suboptimal in terms of time and route length.

10. The route guidance method according to claim 1, further comprising:
    determining a sequence of the outputting of driving recommendations as a function of evaluation of a respective route.

11. The route guidance method according to claim 1, further comprising:
    outputting information about at least one of time and length of routes.

12. The route guidance method according to claim 1, wherein in an event that a vehicle driver uses the route guidance method, travel routes are determined by automatic coordination with neighboring vehicles.

13. The route guidance method according to claim 1, wherein when the driving recommendations are output visually, the driving recommendations are output in at least one of: (i) one of different colors and gray-scale values, and (ii) different levels of brightness, as a function of the evaluation.

14. The route guidance method according to claim 1, wherein the information about the current traffic situation is obtained via at least one of radar sensors, video sensors, biometric sensors, vehicle environment sensors, vehicle-to-vehicle (Car2Car) sensors, vehicle-surroundings sensors (Car2Infrastructure sensors), a TMC system (TMC=Traffic Message Channel), a traffic control center, and a traffic control device.

15. The route guidance method according to claim 1, wherein the risk evaluation at least one of (a) is performed for at least one of (i) turning maneuvers required in order to follow a respective route and (ii) lane changes required in order to follow the respective route, and (b) takes into account at least one of (i) traffic density in the surroundings of a vehicle, (ii) speed of the vehicle, and (iii) alternative routes.

16. A system, comprising:
    at least one of (i) at least one chip and (ii) at least one processor that is configured to calculate at least one route by a navigation system based on information about destination and start location, and configured to output a plurality of alternative routes as a function of a safety risk of the at least one calculated route, wherein the at least one route is evaluated as a function of a dynamic risk, and wherein the dynamic risk is included in a route calculation at a short notice so that information about the current traffic situation in the surrounding of a user of the route guidance method is evaluated.

17. The system according to claim 16, further comprising a navigation system.

18. The system according to claim 16, further comprising:
    at least one of a radar sensor, a video sensor, a biometric sensor, a vehicle environment sensor, a vehicle-to-vehicle (Car2Car) sensor, and a vehicle-surroundings sensor (Car2Infrastructure sensor).

19. A computer readable non-transitory medium having a computer program, which is executable by a data processing device, comprising:
    a program code arrangement having program code for providing route guidance method, by performing the following:
        calculating at least one route by a navigation system based on information about destination and start location, wherein the at least one route is evaluated as a function of a dynamic risk, and wherein the dynamic risk is included in a route calculation at a short notice so that information about the current traffic situation in the surrounding of a user of the route guidance method is evaluated;
        evaluating a risk of motion behavior resulting from the calculated at least one route using results of the evaluation by at least one computer program;
        outputting driving recommendations as a function of the evaluation; and
        outputting a plurality of alternative routes as a function of the risk of the motion behavior of the at least one calculated route.

20. A method for providing route guidance, the method comprising:
    downloading a computer program from an electronic data network to a data-processing device connected to the data network, wherein the computer program, when loaded in a memory of the data processing device, executes a route guidance task, by performing the following:
        calculating at least one route by a navigation system based on information about destination and start location, wherein the at least one route is evaluated as a function of a dynamic risk, and wherein the dynamic risk is included in a route calculation at a short notice so that information about the current traffic situation in the surrounding of a user of the route guidance method is evaluated;
        evaluating a risk of motion behavior resulting from the calculated at least one route using results of the evaluation by at least one computer program;
        outputting driving recommendations as a function of the evaluation; and
        outputting a plurality of alternative routes as a function of the risk of the motion behavior of the at least one calculated route.

* * * * *

UNITED STATES PATENT AND TRADEMARK OFFICE
CERTIFICATE OF CORRECTION

PATENT NO. : 8,620,575 B2  Page 1 of 1
APPLICATION NO. : 12/305445
DATED : December 31, 2013
INVENTOR(S) : Vogt et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1007 days.

Signed and Sealed this
Twenty-second Day of September, 2015

Michelle K. Lee
*Director of the United States Patent and Trademark Office*